United States Patent [19]

Otsuka

[11] Patent Number: 5,404,434
[45] Date of Patent: Apr. 4, 1995

[54] DOCUMENT PROCESSOR HAVING IDENTIFICATION DISPLAY CONTROL MEANS

[75] Inventor: Naoki Otsuka, Kounan, Japan

[73] Assignee: Brother Kogyo Kabushiki Kaisha, Nagoya, Japan

[21] Appl. No.: 802,514

[22] Filed: Dec. 5, 1991

[30] Foreign Application Priority Data

Dec. 11, 1990 [JP] Japan .................................. 2-410199

[51] Int. Cl.6 ............................................ G06F 15/62
[52] U.S. Cl. ............................................ 395/145
[58] Field of Search ................... 400/63, 83; 371/16.4, 371/10.2, 10.3, 10.4; 395/145, 144, 146, 161

[56] References Cited

U.S. PATENT DOCUMENTS

| | | | |
|---|---|---|---|
| 4,525,839 | 6/1985 | Nozawa et al. | 371/10.2 X |
| 4,564,301 | 1/1986 | Ueno | 400/63 X |
| 4,742,485 | 5/1988 | Carlson et al. | 400/63 X |
| 4,800,563 | 1/1989 | Itagaki et al. | 371/10.2 X |
| 4,818,131 | 4/1989 | Sakai | 400/63 X |
| 4,934,851 | 6/1990 | Sasaki | 400/63 X |
| 4,947,370 | 8/1990 | Sugitani | 400/63 X |
| 5,105,427 | 4/1992 | Ando | 371/10.2 X |

OTHER PUBLICATIONS

Alderman et al. (Expert Advisor Wordperfect TM 5.0), 1989, pp. 155-156, 181-184 & 277.
Alderman et al, (Expert Advisor Wordperfect TM 5.0), 1989, pp. 3, 278.

Primary Examiner—Heather R. Herndon
Assistant Examiner—Cliff N. Vo
Attorney, Agent, or Firm—Oliff & Berridge

[57] ABSTRACT

A document control memory makes document name data corresponding to document data and stores the document name data when an instruction is input from a keyboard so that all document data of a plurality of documents stored in the text memory are stored on a floppy disk. A display is controlled so that all document names are displayed on the display based on the document name data stored in the document control memory. The document data stored in the text memory is transferred onto the floppy disk in the order of storage in the document control memory. A display identifies the document name of the document being stored on the floppy disk during storage to distinguish the document being stored on the floppy disk from the other documents in text memory in order to show progress in the storage and to identify where, during storage, an error occurs should such happen.

17 Claims, 6 Drawing Sheets

Fig.5

| | | | |
|---|---|---|---|
| ABC | 1.0 | TEXT3 | 2.0 |
| TEXT5 | 0.1 | TEXT7 | 0.4 |
| BCDE | 0.5 | TEXT8 | 0.6 |
| TEXT13 | 0.2 | TEXT15 | 0.7 |
| TEXT17 | 0.1 | | |

Fig.6

| | | | |
|---|---|---|---|
| ABC | 1.0 | TEXT3 | 2.0 |
| TEXT5 | 0.1 | TEXT7 | 0.4 |
| BCDE | 0.5 | TEXT8 | 0.6 |
| TEXT13 | 0.2 | TEXT15 | 0.7 |
| TEXT17 | 0.1 | | |

"DISK ERROR"
"CANCEL THE PROCESS? TYPE Y OR N KEY."

DOCUMENT PROCESSOR HAVING IDENTIFICATION DISPLAY CONTROL MEANS

BACKGROUND OF THE INVENTION

1. Field of the Invention

The invention relates to a document processor having memory means with a memory medium and, more particularly, to a document processor which can identify and display a document name of a document being stored in the memory medium on a display while all document data stored in the text memory are stored in the memory medium.

2. Description of Related Art

Conventionally, there is a word processor for English which has a floppy disk drive device in which a floppy disk can be installed removably. The word processor stores in sequence a plurality of documents, inputted by keyboard, into a text memory. Then, the word processor stores the beginning of the address, in the text memory where the document and the document name data concerning the document are stored, into a document control memory whenever new document data is stored in the text memory.

The word processor displays the list of the document names on the display of the document data stored in the text memory that may be stored on a floppy disk. Next, the user selects a desired document or documents from the list and operates the executing key. As a result, the word processor stores in sequence the document data of the selected document names onto the floppy disk. At this time, the word processor displays a message, for example, "While executing the process" on the display until all selected document data are stored onto the floppy disk. When an error happens while executing the memory storage, the word processor displays a message, for example, "Disk error" on the display.

As described above, the conventional word processor only displays "While executing the process" on the display until the selected document data is completely stored onto the floppy disk. Therefore, there is a problem in that the user cannot observe what document data is being stored, that is, the user cannot observe the progress of the memory storage. Moreover, there is an another problem in that the user does not know when an error occurs, that is, the user cannot see what document data causes the error even if a message informs the user that an error has occurred.

SUMMARY OF THE INVENTION

An object of the invention is to provide a document processor by which an user can recognize what document data is being stored in the memory medium.

An another object of the invention is to provide a document processor by which the user can recognize when an error occurs, that is, what document data is being stored in the memory medium when the error occurs.

As shown in FIG. 1, the document processor of the invention comprises: input means for inputting the document data and various instruction signals; text memory for storing the document data for a plurality of documents inputted by means of the input means; document control memory for storing the document name of the document so as to correspond to the document data whenever the document data is stored in the text memory; display means for displaying characters and symbols on the display; memory means having a memory medium for storing the document data stored in the text memory; document names display control means for displaying all document names based on the document name data stored in said document control memory according to a storage instruction by said input means to store all the document data stored in said text memory into the memory medium; storage control means for storing the document data stored in the text memory in the memory medium in sequence of the storage in the document control memory; error recognition means for recognizing an error which occurs while the storage control means stores the document data in the memory medium; identification display control means for displaying the document name of the document that the memory means is storing into the memory medium on the display as to identify the document being stored; error display control means for controlling the display control means to display the content of the error recognized by the error recognition means; and storage judgment means for judging whether the memory storage by the storage control means is to be continued by an instruction from the input means when the error recognition means recognizes the error.

In the document processor of the invention, the document name control means displays all document names on the display means based on the document name data stored in the document control memory. When the document name display control means receives a storage instruction from the input means specifying all or some of document data stored in the text memory, the selected document data is stored in the memory medium. The storage control means stores the document data stored in the text memory into the memory medium in the storage sequence as found in the document control memory. At this time, the identification display control means displays the document name of the document being stored in the memory medium to distinguish the document being stored from the other documents in the text memory.

The error recognition means recognizes errors occurring while the storage control means is storing the document data. The error display control means controls the display control means so that the content of the error recognized by the error recognition means is displayed on the display. The storage judgment means judges whether the memory storage by the storage control means is to be continued. Since the document name of the document being stored in the memory medium is displayed on the display according to the document processor of the invention, the user can observe easily the progress of the memory storage. In addition, since the document processor informs the user when an error occurs during the document data storage by means of the display, the user can identify which document data has caused the error.

BRIEF DESCRIPTION OF THE DRAWINGS

The invention will be described with reference to the following figures:

FIG. 5 shows a sample display of documents and sizes for the document data storage control;

FIG. 6 shows a sample display for error recognition during the document data storage control.

DETAILED DESCRIPTION OF THE PREFERRED EMBODIMENTS

Hereinafter, an embodiment of the invention will be explained with reference to the Figures.

This embodiment applies the invention to a word processor for English which has a floppy disk drive device.

Figure 1:
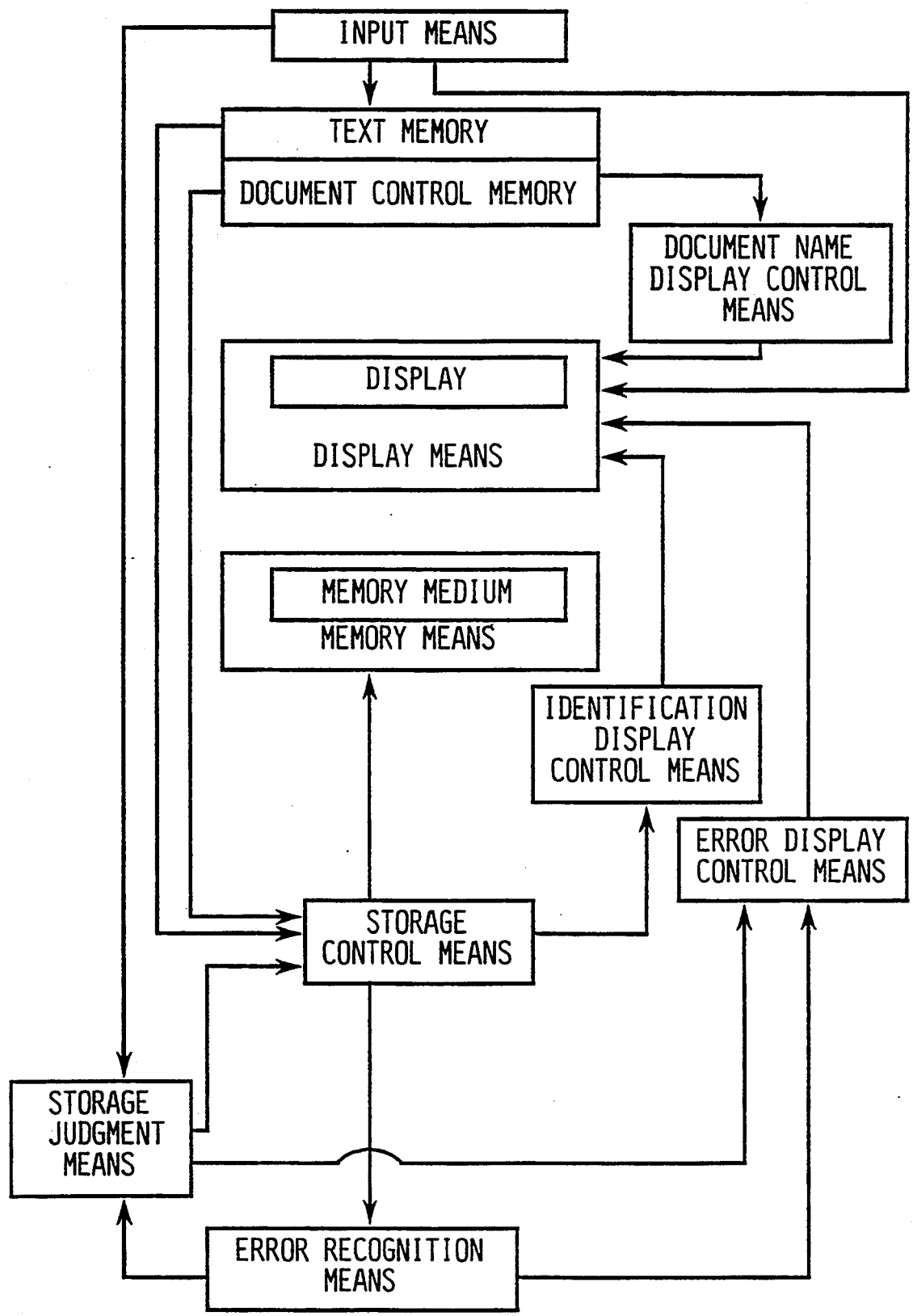
FIG. 1 is a functional block diagram showing the structure of the invention.
Figure 2:
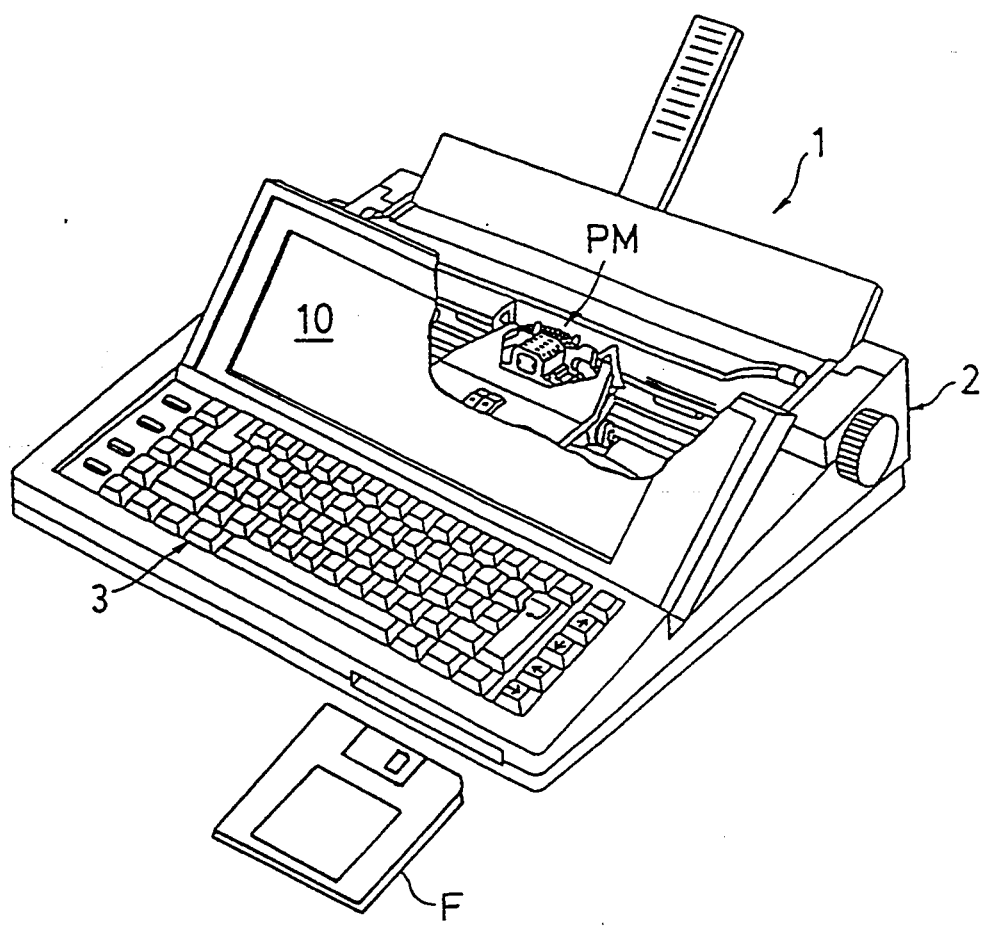
FIG. 2 is a perspective view of a word processor.

As shown in FIG. 2, a keyboard 3 is provided on the front portion of a main body frame 2 of a word processor 1. At the rear of the keyboard 3, in the main frame 2, a print mechanism PM, which is shown as a daisy wheel type, is installed. At the rear of the keyboard 3, a LCD display 10, for displaying characters and symbols in up to fourteen lines, is installed. Under the keyboard 3, in the main body frame 2, a floppy disk drive device FD (reference FIG. 3) is installed in order to store the document data onto a floppy disk F which is removably installed therein.

The keyboard 3 has character keys, such as alphabet keys, figure keys and symbolic keys, a space key, a return key, cursor movement keys for moving a cursor on the display 10 in the up, down, right, or left directions and an end key for ending various editing functions.

The shown printing mechanism PM has as a general structure a platen, a carriage and a daisy wheel.

Figure 3:
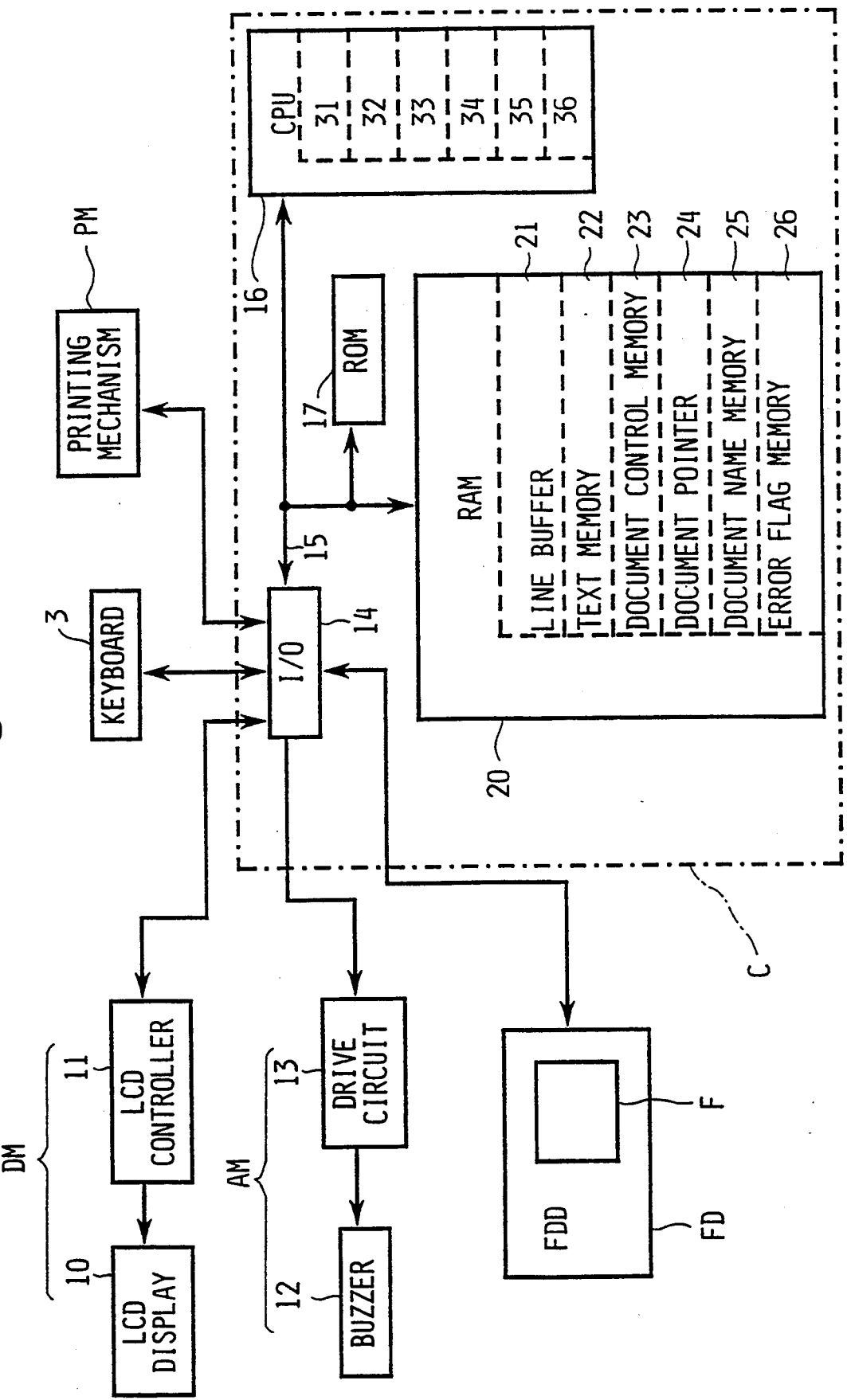
FIG. 3 is a block diagram of a control system for the word processor.

Next, the control system for the word processor 1 is structured as shown the block diagram of in FIG. 3.

A display mechanism DM comprises the liquid crystal display 10 and a display controller 11 which has RAM for display and a character generator ROM. The display RAM outputs the display data to the display 10. The ROM stores dot patterns for such as characters and symbols. An alarm mechanism AM comprises a buzzer 12 and a drive circuit 13 which makes the buzzer 12 sound.

A controller C is comprised of a CPU 16, an I/O interface 14 which is connected to the CPU 16 through a bus 15, such as a data bus, a ROM 17 and a RAM 20.

The ROM (program memory) 17 stores the display control program, the write control program, a document control program, a print control program, a storage control program, a processing control program and the main control program.

The display control program is a program for controlling the display mechanism DM according to the data inputted from the keyboard 3. The write control program is a program for storing the code data in the text memory 22, as the document data, through a line buffer 21. The document control program is a program for associating the document data with the first address of the document data in the text memory 22, the data capacity and the document name data of the document whenever new document data is stored in the text memory 22, and storing the first address, the data capacity and the document name data in the document control memory 23.

The print control program is a program for controlling the printing mechanism PM according to the document data in the text memory 22. The storage control program is a program for transmitting the document data which has the document name selected from the document data on the text memory 22 to the floppy disk drive device FD, and storing the document data on the floppy disk F. The processing control program is a program for executing the processing functions displayed by a main menu such as a disk copy processing function. The main control program is a program for the document data storage control which is executed when one of the processings, including the disk copy processing, is selected.

The line buffer 21 of the RAM 20 stores therein the data of one line input from the keyboard 3 and displayed on the display 10 or the document data of one line which is pointed to by the cursor out of a plurality of lines of the document data read from the text memory 22 and displayed on the display 10. The text memory 22 receives the data of one line from the line buffer 21 in turn and stores it in the document data.

The document control memory 23 stores the document control data therein. The document control data comprises the document name data for showing the document name of the document data stored in the text memory 22, the first address in the text memory 22 in which the document data is stored, and the capacity data for showing the memory capacity (memory space required) of the document data. A document pointer 24 stores the first address of the document control data stored in the document control memory 23. The document name memory 25 stores the document capacity data which consists of the document name data and the capacity data from the document control data. An error flag memory 26 stores the flag data for a plurality of error flags that are set according to the content of the error which happen while the document data stored in the text memory 22 is being stored on the floppy disk F. The document control memory 23 and the document pointer 24 are powered by a back-up battery so the contents of their memories are not lost when the main power is shut off.

The CPU 16 comprises the document name display control means 31, the storage control means 32, the error recognition means 33, the identification display control means 34, the error display control means 35 and the storage judgment means 36.

The document name display control means 31 controls the display of all document names on the LCD display 10, based on the document name data stored in the document control memory 23 when the document name display control means 31 receives the storage instruction, from the keyboard 3, to store document data stored in the text memory 22 onto the floppy disk F. The storage control means 32 stores, in storage sequence, the document data stored in the text memory 22 onto the floppy disk F according to the storage order in the document control memory 23. That is, the document data which is first stored in the text memory 22 is first stored in the floppy disk F.

The error recognition means 33 recognizes any error that occurs while the document data is being stored on the floppy disk F by the storage control means 32. The identification display control means 34 displays the document name of the document being stored by the storage control means 32 on the LCD display 10 so as to distinguish the document name being stored from other documents in the text memory. The error display control means 35 controls the display of the content of the error recognized by the error recognition means 33 on the LCD display 10. The storage judgement means 36 judges whether the memory storage by the storage control means 32 is to be continued according to the instruction inputted by the keyboard 3 when the error recognition means 35 recognizes an error.

Figure 4:
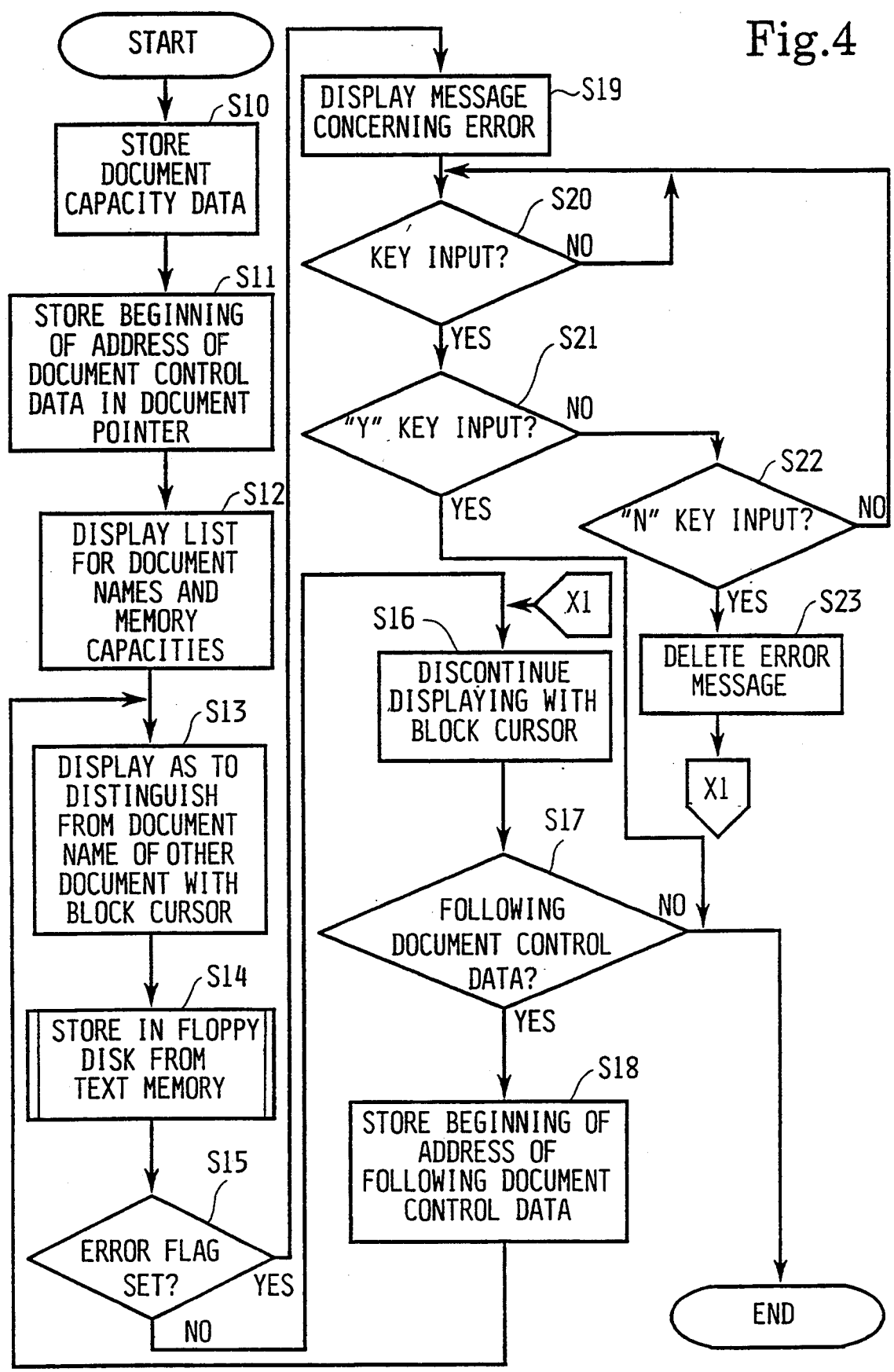
FIG. 4 is a flowchart showing the routine for document data storage control.

FIG. 4 is a flowchart showing the routine of the document data storage control executed in the controller C of the word processor 1. This description of the control processing is based on the assumption that there is document data that has been previously stored in the text memory 22 and document control data stored in the document control memory 23. In this case, when the disk copy processing or processing which uses graphic data is selected on the main menu display, the document data already present in the text memory 22 will be destroyed unless it is saved out to another storage medium, thus the control is started to store all existing document data in the text memory 22 on the floppy disk F before the selected processing is executed. Si (i=10, 11, 12 . . . ), shown in the figure, designate the steps.

When the control is started, the storage control means 32 stores, in sequence, the document capacity data including the document name data and the capacity data for each document, in the document name memory 25 based on the document control data stored in the document control memory 23 (S10). The storage control means 32 also stores the beginning address of the document control data of the document control memory 23 in the document pointer 24 (S11). The document name display control means 31 displays the list of the document names, and the document memory capacities in the text memory 22, on the display 10 based on the document name data stored in the document name memory 25 (S12). For example, as shown in FIG. 5, the document names stored in the document name memory 25, 「ABC」, 「TEXT3」, 「TEXT5」, . . . are displayed on the display 10 along with the document memory capacity corresponding to the document name, 「1.0」, 「2.0」, 「0.1」, . . . (K bite) by the document name display control means 31.

The identification display control means 34 displays the document name of the document control data indicated by the document pointer 24 with the block cursor 30 (S13). The storage control means 32 reads the document data corresponding to the document name data, indicated by the document pointer 24, from the text memory 22 based on the document control data and stores it on the floppy disk F (S14). That is, the user can identify the document being stored on the floppy disk F from the other documents in the text memory by the document name being indicated or highlighted by the block cursor 30. For example, as shown in FIG. 5, the document name 「ABC」 is shown with the block cursor 30 so the user can determine the document, corresponding to the document name 「ABC」 in this case being stored on the floppy disk F from the other documents held in the text memory 22.

Next, if the error recognition means 33 does not recognize an error and does not set one of the error flags stored in the error flag memory 26 (S15:No), the identification display control means 34 discontinues the identification display using the block cursor 30 of the document name when the document data storage processing is ended (S16). If further document control data exists in the document control memory 23 (S17:Yes), such as shown in FIG. 5, the storage control means 32 stores the first address of the following document control data in the document pointer 24 (S18) and the processing returns to S13. In FIG. 5, the block cursor 30 would now identify 「TEXT3」. If following document control data does not exist in the document control memory 23 (S17:No), the storage control means 32 ends this control. Then, the selected processing control that initiated the process is executed.

On the other hand, when the error recognition means 33 recognizes an error and sets an error flag (S15:Yes) the buzzer 12 sounds while the document name is displayed with the block cursor 30. The error display control means 35 displays the message concerning the recognized error on the LCD display 10 (S19). For example, as shown in FIG. 6, the error happens while the storage control means 32 is storing the document data corresponding to the document name 「TEXT3」 on the floppy disk F and the identification display control means 34 displaying the document name 「TEXT3」 with the block cursor 30. Thus, the error display control means 33 displays the error message on the message line which is the last two lines of the display 10. For example, a message indicating the type of error, such as "Disk error" and a message asking the user whether the processing is to be continued "Cancel the process?" is displayed. In this case, where the disk error is caused by a damaged disk, it is futile to continue storage processing. Therefore, even if the user operates the "Y" key (S20·S21:Yes), the storage judgment means 36 gives the storage control means 32 instructions to end the processing.

Figure 7:
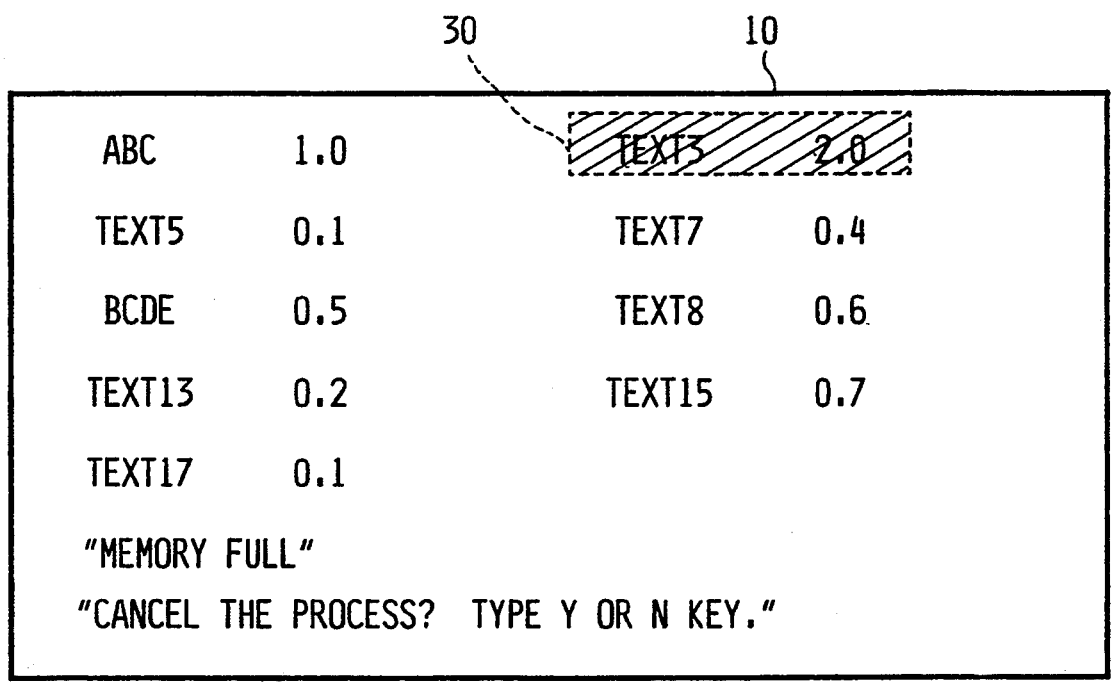
FIG. 7 shows a sample display for another type of error recognition during the document data storage control.

However, if, as shown in FIG. 7, the error is "memory full" indicating the memory capacity of the floppy disk F is full, if the memory capacity of 「TEXT3」 is 2.0 K bite and the memory capacity of 「TEXT7」 is 0.4 K bite, then, even if the error message "Memory full" is displayed, 「TEXT7」 may still be stored on the floppy disk F because 0.4 K bite is less than 2.0 K bite. Thus, the memory may have sufficient memory capacity to store this smaller document. Therefore, if the user operates the "N" key (S20:Yes, S21:No, S22:Yes), the storage judgment means 36 sends the error processing removing instruction to the error display control means 35 so that the display of the error message is deleted (S23) and the identification display control means 34 executes the process after S16.

As described above, when the storage control means 32 stores the document data stored on the text memory 22 on the floppy disk F, the display control means 31 displays all of the document names, of the data stored in the text memory 22, on the display 10 based on the document control data stored in the document control memory 23. At this time, the identification display control means 34 displays the document name of the document actually being stored at that time on the floppy disk F on the display 30 with the block cursor. Therefore, the user can easily recognize the progress of the memory storage processing by the identification display of the document name.

If an error occurs while processing the memory storage, the user can easily recognize the document data which causes the error through the document name indicated with the block cursor 30.

The document name may also be displayed using a blinking display or displays other than the block cursor 30.

The present invention can be applied to the case where the document data, stored in the text memory 22, are stored on the floppy disk F by various instructions such as a single document text of selection of less than all the existing document texts.

In addition, the present invention can be applied to a European language word processor or a Japanese word processor having a floppy disk drive device, a hard disk device and mass RAM (RAM disk) made backed up so that the document data is stored on the floppy disk, the hard disk and the RAM disk.

What is claimed is:

1. A document processor having identification display control means, comprising:

input means for inputting document data and various instruction signals;

text memory for storing the document data for a plurality of documents inputted by means of said input means;

document control memory for storing the document name data of the document so as to correspond to the document data whenever the document data is stored in said text memory;

display means for displaying characters and symbols on a display;

memory means having a storage memory medium for storing the document data stored in said text memory;

document name display control means for displaying all document names based on the document name data stored in said document control memory according to a storage instruction by said input means to store all the document data stored in said text memory into the storage memory medium;

storage control means for storing the document data stored in said text memory into the storage memory medium in storage sequence in said document control memory;

identification display control means for distinguishing the document name of the document that said memory means is currently storing into the storage memory medium on the display so as to identify the document name of the document being stored from that of another listed document;

an error recognition means for determining an error occurs when the document data is being stored onto the long term storage memory medium; and error display control means to display the type of error on the display device in addition to the displayed document names and document sizes for the plurality of documents.

2. The document processor according to claim 1, wherein said document control memory stores document control data therein, the document control data includes document name data, beginning of the address corresponding to the document data of the document name stored in said text memory and capacity data for representing the memory capacity required for the document data.

3. The document processor according to claim 2, further comprising a document pointer for storing the address of the document control data stored in said document control memory.

4. The document processor according to claim 2, wherein said document name display control means displays the document name and the memory capacity corresponding to the document name on the display means based on the capacity data and the document name data in the document control data.

5. A document processor having identification display control means comprising:

input means for inputting document data and various instruction signals;

text memory for storing the document data for a plurality of documents inputted by means of said input means therein;

document control memory for storing the document name data of the document so as to correspond to the document data whenever the document data is stored in said text memory;

display means for displaying characters and symbols on a display;

memory means having a storage memory medium for storing the document data stored in said text memory;

document name display control means for displaying all document names based on the document name data stored in said document control memory according to a storage instruction by said input means to store all the document data stored in said text memory into the storage memory medium;

storage control means for storing the document data stored in said text memory into the storage memory medium in storage sequence in said document control memory;

error recognition means for recognizing an error which occurs while said storage control means stores the document data in the storage memory medium;

identification display control means for displaying the document name of the document that said storage control means is storing via the memory means into the storage memory medium on the display as to identify the document name from that of another document; and error display control means to display the content of the error recognized by said error recognition means.

6. The document processor according to claim 5, further comprising storage judgment means for judging whether the storage of said storage control means is to be continued according to the instruction by said input means when said error recognition means recognizes an error, and said storage control means stores a following document data stored in the text memory into the storage memory medium when said storage judgment means judges that the storage is to be continued.

7. The document processor according to claim 6, wherein said error display control means deletes the content of the error displayed on the display when said storage judgment means judges that the memory storage is to be continued.

8. The document processor according to claim 6, wherein said storage control means discontinues storing the document data stored in said text memory into the storage memory medium when said storage judging means judges that the memory storage is to be stopped.

9. The document processor according to claim 5, further comprising error flag memory having a plurality of error flags to be set according to the content of the error, wherein said error recognition means which recognizes the error when the error flag is set and said error display control means causes the content of the error to be displayed according to the set error flag.

10. The document processor according to claim 5, further comprising alarm means, wherein said alarm means alarms an operator when said error recognition means recognizes the error.

11. A document processor having a processor body with an input means for inputting document data and control instructions and a visual display device attached thereto, the document processor further comprising:

an internal text memory for storing document data for a plurality of documents inputted by means of the input means;

a document control memory for storing document name data for a document name for each of the plurality of documents stored in said internal text memory, said document control memory further containing a beginning address for the document data and a size of the document data associated with the document name data of each of the plurality of documents;

document name display control means for controlling the display of the document names stored in said document control memory on the display device and causes the size to be displayed on the display device along with the document name;

storage control means for storing the document data stored in said text memory onto a long term storage memory medium in a storage sequence as stored in said document control memory;

identification control means for controlling an indication of the document data currently being stored onto said long term storage memory medium from that of other displayed document data;

an error recognition means for determining an error occurs when the document data is being stored onto the long term storage memory medium; and error display control means to display the type of error on the display device in addition to the displayed document names and document sizes for the plurality of documents.

12. The document processor as claimed in claim 11, further comprising storage judgment means for judging whether the storage of said storage control means is to be continued according to the instruction by said input means when said error recognition means recognizes an error, and said storage control means stores a following document data stored in the text memory onto the long term storage memory medium when said storage judgment means judges that the storage is to be continued.

13. The document processor as claimed in claim 12, wherein said error display control means deletes the content of the error displayed on the display when said storage judgment means judges that the memory storage is to be continued.

14. The document processor as claimed in claim 12, wherein said storage control means discontinues storing the document data stored in said text memory onto the long term storage memory medium when said storage judging means judges that the memory storage is to be stopped.

15. The document processor as claimed in claim 11, further comprising error flag memory having a plurality of error flags to be set according to the content of the error, wherein said error recognition means which recognizes the error when the error flag is set and said error display control means causes the content of the error to be displayed according to the set error flag.

16. The document processor as claimed in claim 11, further comprising alarm means, wherein said alarm means alarms an operator when said error recognition means recognizes the error.

17. The document processor as claimed in claim 11, wherein said identification control means causes a block cursor to identify the document name of a document of the plurality of documents being processed.

* * * * *